(12) United States Patent
Kitayama

(10) Patent No.: US 7,154,897 B2
(45) Date of Patent: Dec. 26, 2006

(54) GATEWAY DIGITAL LOOP CARRIER DEVICE

(75) Inventor: Seiji Kitayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 09/960,096

(22) Filed: Sep. 21, 2001

(65) Prior Publication Data
US 2002/0164009 A1 Nov. 7, 2002

(30) Foreign Application Priority Data
May 7, 2001 (JP) .............................. 2001-136142

(51) Int. Cl.
 H04L 12/28 (2006.01)
 H04J 3/16 (2006.01)
 H04J 3/22 (2006.01)
 H04J 3/12 (2006.01)

(52) U.S. Cl. ...................... 370/401; 370/466; 370/467; 370/524

(58) Field of Classification Search ........ 370/465–467, 370/524
 See application file for complete search history.

(56) References Cited

U.S. PATENT DOCUMENTS

| 4,740,963 | A | * | 4/1988 | Eckley | 370/522 |
| 4,817,092 | A | * | 3/1989 | Denny | 714/10 |
| 5,355,362 | A | * | 10/1994 | Gorshe et al. | 370/222 |
| 5,940,388 | A | * | 8/1999 | Nahar et al. | 370/359 |
| 6,049,550 | A | * | 4/2000 | Baydar et al. | 370/466 |
| 6,480,487 | B1 | * | 11/2002 | Wegleitner et al. | 370/354 |

OTHER PUBLICATIONS tdSoft Communications News Release, Oct. 10, 1999.*
tdSoft Communications News Release, Mar. 16, 2000.*
Interconnection Agreement Between BellSouth Telecommunications, Inc. and Al-Call, Inc., Section 5.1.1, Feb. 1, 1998.*
Comsphere 6800 Series Network Management System, pp. 2-14, 2-17, 2-54 to 2-62, 2-78, 2-118, 2-135, 2-171, 2-296, Jan. 1997.*

* cited by examiner

Primary Examiner—Ricky Q. Ngo
Assistant Examiner—Warner Wong
(74) Attorney, Agent, or Firm—Katten Muchin Rosenman LLP

(57) ABSTRACT

A gateway digital loop carrier device accommodates an integrated access device accommodating as a subscriber at least one of a telephone, a modem and ISDN and implementing a TR-008 interface, executes an interface conversion between TR-008 and TR/GR-303, and connects the subscriber to a switch implementing a TR-303 or GR-303 interface.

10 Claims, 14 Drawing Sheets

FIG. 1A

| TRANSMISSION TO SWITCH | | | RECEIPT FROM SWITCH | | |
|---|---|---|---|---|---|
| STATE | A | B | STATE | A | B |
| On-Hook | 0 | 0 | Channnel Test | 0 | 1 |
| Off-Hook | 1 | 0 | Forward Disc. | 1 | 0 |
| Unequipped | 1 | 1 | Idle | 1 | 1 |
| UNDEFINED | 0 | 1 | -R Ringing | 1 | 1/0 |

*1/0 REPRESENTS THAT "1"A DN "0" ARE INTERCHANGEABLE
(IF "1" AT PRESENT, "0" COMES AT NEXT CYCLE)

FIG. 1B

| TRANSMISSION TO SWITCH | | | | | RECEIPT FROM SWITCH | | | | |
|---|---|---|---|---|---|---|---|---|---|
| STATE | A | B | C | D | STATE | A | B | C | D |
|  | 0 | 0 | 0 | 0 | -R Ringing | 0 | 0 | 0 | 0 |
|  | 0 | 0 | 0 | 1 |  | 0 | 0 | 0 | 1 |
| DS0 AIS | 0 | 0 | 1 | 0 | DS0 AIS | 0 | 0 | 1 | 0 |
|  | 0 | 0 | 1 | 1 |  | 0 | 0 | 1 | 1 |
|  | 0 | 1 | 0 | 0 | RLCF | 0 | 1 | 0 | 0 |
| LO | 0 | 1 | 0 | 1 | LCF | 0 | 1 | 0 | 1 |
|  | 0 | 1 | 1 | 0 |  | 0 | 1 | 1 | 0 |
| DS0 RAI | 0 | 1 | 1 | 1 | DS0 RAI | 0 | 1 | 1 | 1 |
| Reserverd | 1 | 0 | 0 | 0 | Reserverd | 1 | 0 | 0 | 0 |
|  | 1 | 0 | 0 | 1 |  | 1 | 0 | 0 | 1 |
|  | 1 | 0 | 1 | 0 |  | 1 | 0 | 1 | 0 |
|  | 1 | 0 | 1 | 1 |  | 1 | 0 | 1 | 1 |
|  | 1 | 1 | 0 | 0 |  | 1 | 1 | 0 | 0 |
| Reserverd | 1 | 1 | 0 | 1 | Reserverd | 1 | 1 | 0 | 1 |
|  | 1 | 1 | 1 | 0 |  | 1 | 1 | 1 | 0 |
| LC | 1 | 1 | 1 | 1 | LCFO | 1 | 1 | 1 | 1 |

*BLANK INDICATES "UNDEFINED"

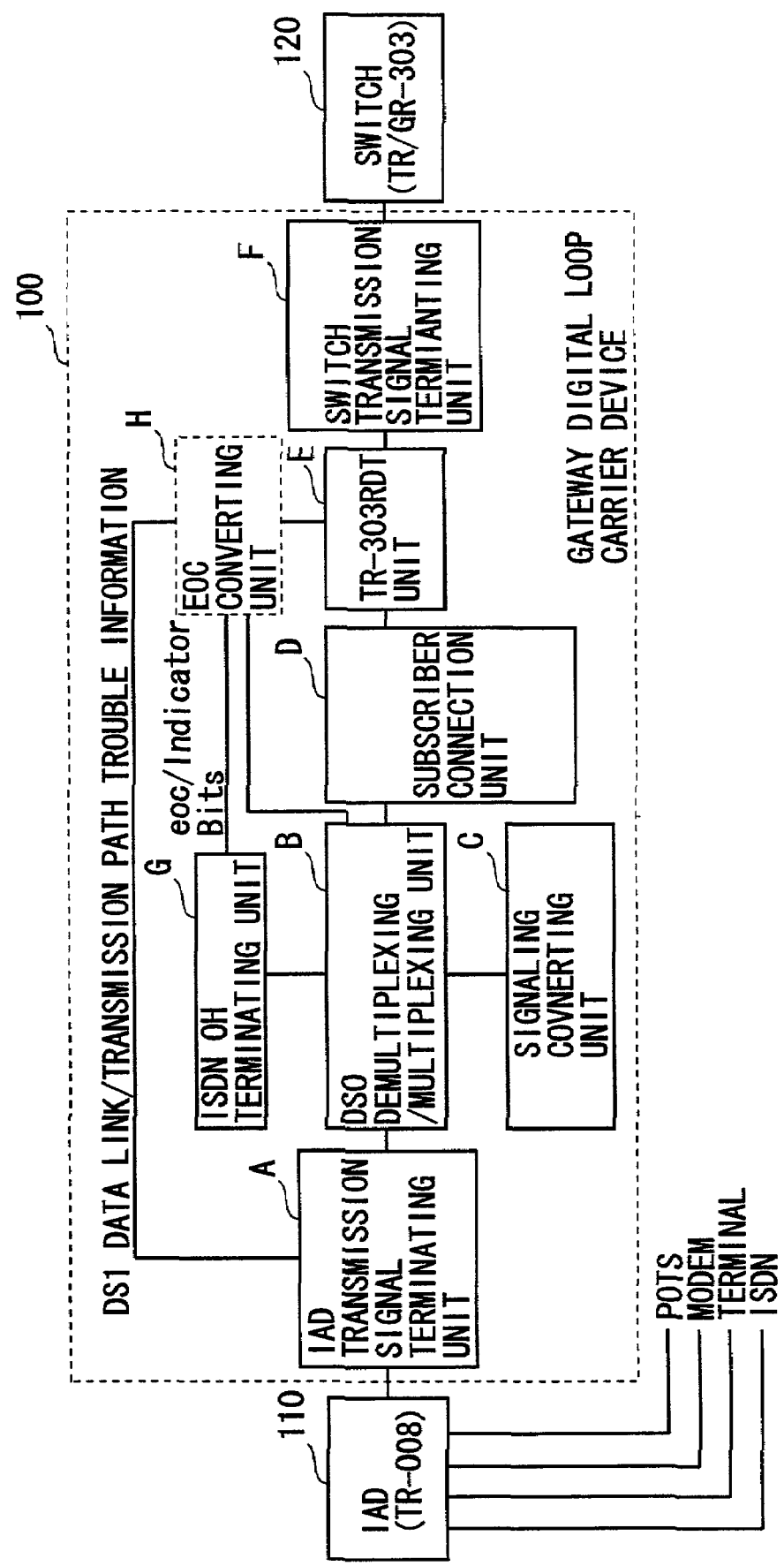

FIG. 3A (1) CONVERSION FROM ABCD PATTERN INTO AB PATTERN
(SWITCH → INTEGRATED ACCESS DEVICE)

| SIGNALING FROM SWITCH | | | | SIGNALING TYPE (1/2) | | | | | | | | | | | | | | | | | | |
|---|---|---|---|---|---|---|---|---|---|---|---|---|---|---|---|---|---|---|---|---|---|---|
| | | | | Signale Party (POTS) | | | | | UVG-LS, UVG-GS | | | | | COIN-DTF, COIN-CF | | | | | AN12 | | | | | DID-DPT | | | | |
| A | B | C | D | *1 | A | B | A' | B' | *1 | A | B | A' | B' | *1 | A | B | A' | B' | *1 | A | B | A' | B' | *1 | A | B | A' | B' |
| 0 | 0 | 0 | 0 | 1 | 1 | 1/0 | 1 | 1 | 1 | 1 | 1/0 | 1 | 1 | 1 | 1 | 1/0 | 1 | 1 | 1 | 1 | 1/0 | 1 | 1 | 0 | * | * | * | * |
| 0 | 0 | 0 | 1 | 0 | * | * | * | * | 0 | 0 | 0 | 0 | 0 | 0 | 0 | 0 | 0 | 0 | 0 | 0 | 0 | 0 | 0 | 0 | * | * | * | * |
| 0 | 0 | 1 | 0 | 1 | 1 | 1 | 1 | 1 | 1 | 0 | 1/0 | 0 | 0/1 | 1 | 0 | 1 | 0 | 0 | 1 | 1 | 1 | 1 | 1 | 1 | 1 | 1 | 1 | 1 |
| 0 | 0 | 1 | 1 | 0 | * | * | * | * | 0 | 0 | 0 | 0 | 0 | 0 | 0 | 0 | 0 | 0 | 0 | 0 | 0 | 0 | 0 | 0 | * | * | * | * |
| 0 | 1 | 0 | 0 | 1 | 1 | 1 | 1 | 1 | 1 | 0 | 1/0 | 0 | 0/1 | 1 | 1 | 0 | * | * | 1 | 1 | 1 | 1 | 1 | 0 | * | * | * | * |
| 0 | 1 | 0 | 1 | 0 | * | * | * | * | 0 | 0 | 0 | 0 | 0 | 0 | 0 | 0 | 0 | 0 | 0 | 0 | 0 | 0 | 0 | 1 | 1 | 0 | 1 | 0 |
| 0 | 1 | 1 | 0 | 0 | * | * | * | * | 0 | * | * | * | * | 0 | * | * | * | * | 0 | * | * | * | * | 0 | * | * | * | * |
| 0 | 1 | 1 | 1 | 0 | * | * | * | * | 0 | * | * | * | * | 0 | * | * | * | * | 0 | * | * | * | * | 0 | * | * | * | * |
| 1 | 0 | 0 | 0 | 0 | * | * | * | * | 0 | * | * | * | * | 0 | * | * | * | * | 0 | * | * | * | * | 0 | * | * | * | * |
| 1 | 0 | 0 | 1 | 0 | * | * | * | * | 0 | * | * | * | * | 0 | * | * | * | * | 0 | * | * | * | * | 0 | * | * | * | * |
| 1 | 0 | 1 | 0 | 0 | * | * | * | * | 0 | * | * | * | * | 0 | 1/0 | 1/0 | 0/1 | 0/1 | 1 | 1/0 | 1/0 | 0/1 | 0/1 | 0 | * | * | * | * |
| 1 | 0 | 1 | 1 | 0 | * | * | * | * | 0 | * | * | * | * | 0 | 1/0 | 1/0 | 0/1 | 0/1 | 0 | 1/0 | 1/0 | 0/1 | 0/1 | 0 | * | * | * | * |
| 1 | 1 | 0 | 0 | 0 | * | * | * | * | 0 | * | * | * | * | 0 | 1/0 | * | 0/1 | * | 1 | 1/0 | * | 0/1 | * | 0 | * | * | * | * |
| 1 | 1 | 0 | 1 | 0 | * | * | * | * | 0 | * | * | * | * | 0 | 1/0 | * | 0/1 | * | 0 | 1/0 | * | 0/1 | * | 0 | * | * | * | * |
| 1 | 1 | 1 | 0 | 0 | * | * | * | * | 0 | * | * | * | * | 0 | * | * | * | * | 0 | * | * | * | * | 0 | * | * | * | * |
| 1 | 1 | 1 | 1 | 1 | 1 | 1 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |

(*1) 1: ABCD→AB CONVERSION IS EFFECTIVE, 0: CONVERSION IS INEFFECTIVE, AND SIGNALING ONE CYCLE BEFORE IS TRANSMITTED.
* UNDEFIND IN TR-303 OR RESERVED, AND AB SIGNALING ONE CYCLE BEFORE IS TRANSMITTED. 1/0 AND 0/1 EACH INDICATES THE "1" AND "0" ARE INTERCHANGEABLE AND IMPLIES THAT IF, E.G., A BIT IS 0, A' BIT BECOMES 1.

FIG. 3B (1) CONVERSION FROM ABCD PATTERN INTO AB PATTERN
(SWITCH → INTEGRATED ACCESS DEVICE)

| SIGNALING FROM SWITCH | | | | SIGNALING TYPE (2/2) | | | | | | | | | | | | | | | | | |
|---|---|---|---|---|---|---|---|---|---|---|---|---|---|---|---|---|---|---|---|---|---|
| | | | | DID-DPO | | | | FXO-LS | | | | FXO-GS, TDM-FXS | | | | FXS-LS, TDM-FXO | | | | DX, E&M, PLR, TDM-E&M | |
| A | B | C | D | *1 | A | B | A' | B' | *1 | A | B | A' | B' | *1 | A | B | A' | B' | *1 | A | B | A' | B' | *1 | A | B | A' | B' |

(*1) 1: ABCD→AB CONVERSION IS EFFECTIVE, 0: CONVERSION IS INEFFECTIVE, AND SIGNALING ONE CYCLE BEFORE IS TRANSMITTED.
* UNDEFIND IN TR-303 OR RESERVED, AND AB SIGNALING ONE CYCLE BEFORE IS TRANSMITTED. 1/0 AND 0/1 EACH INDICATES THE "1" AND "0" ARE INTERCHANGEABLE AND IMPLIES THAT IF, E.G., A BIT IS 0, A' BIT BECOMES 1.

FIG. 4A (2) CONVERSION FROM AB PATTERN INTO ABCD PATTERN (INTEGRATED ACCESS DEVICE → SWITCH), 1··· SIGNALING TO SWITCH, 2··· SIGNALING CATEGORY

| SIGNALING TO SWITCH | | | | SIGNALING TYPE (1/2) | | | | | | | | | | | | | | | | |
|---|---|---|---|---|---|---|---|---|---|---|---|---|---|---|---|---|---|---|---|---|
| | | | | Single Party (POTS) | | | | | UVG-LS, UVG-GS | | | | | COIN-DTF, COIN-CF, AN12 | | | | | DID-DPT | | | | |
| A | B | A' | B' | *1 | A | B | C | D | *2 | *1 | A | B | C | D | *2 | *1 | A | B | C | D | *2 | *1 | A | B | C | D | *2 |
| 0 | 0 | 0 | 0 | 1 | 0 | 1 | 0 | 1 | 1 | 1 | 0 | 0 | 1 | 1 | 1 | 1 | 0 | 1 | 1 | 1 | 1 | 1 | 0 | 1 | 0 | 1 | 1 |
| 0 | 1 | 0 | 1 | 1 | 1 | 1 | * | 0 | 1 | 1 | 1 | 1 | 0 | 0 | 0 | 1 | 1 | 1 | * | 1 | 1 | 0 | 0 | * | 1 | 0 | 0 |
| 1 | 0 | 1 | 0 | 0 | 1 | 0 | 1 | 1 | 0 | 0 | 1 | 0 | 1 | 1 | 0 | 0 | 1 | 0 | 1 | 1 | 0 | 1 | 0 | 1 | 0 | 0 | 1 |
| 1 | 1 | 0/1 | 0/1 | 0 | * | * | * | * | 1 | 0 | * | * | * | * | 1 | 0 | * | * | * | * | 1 | 0 | * | * | * | * | 1 |
| 1/0 | 0 | 1/0 | 1 | 0 | 1 | 0 | 1 | 1 | 1 | 0 | 1 | 0 | 1 | 1 | 1 | 0 | 1 | 0 | 1 | 1 | 1 | 0 | 1 | 0 | 1 | 0 | 1 |
| 1/0 | 1 | 0/1 | 1 | 0 | 1 | 1 | * | 0 | 1 | 0 | 1 | 1 | 0 | 0 | 1 | 0 | 1 | 1 | * | 1 | 1 | 0 | 0 | * | 1 | 0 | 1 |
| 1/0 | 1/0 | 1/0 | 0/1 | 0 | * | * | * | * | 1 | 0 | * | * | * | * | 1 | 0 | * | * | * | * | 1 | 0 | * | * | * | * | 1 |

(*1) 1:AB → ABCD CONVERSION IS EFFECTIVE, 0: CONVERSION IS INEFFECTIVE, AND SIGNALING ONE CYCLE BEFORE IS TRANSMITTED.

(*2) 1: AFTER AB→ABCD CONVERSION, RECOGNITION IS THAT IT IS ON-HOOK STATE, 0: RECOGNITION OF IT IS OFF-HOOK (CALLING) STATE.

* UNDEFINED IN TR-303 OR RESERVED, AND ABCD SIGNALING ONE CYCLE BEFORE IS TRANSMITTED. 1/0 AND 0/1 EACH INDICATES THE "1" AND "0" ARE INTERCHANGEABLE AND IMPLIES THAT IF, E.G., A BIT IS 0, A' BIT BECOMES 1.

*FIG. 4B*

(2) CONVERSION FROM AB PATTERN INTO ABCD PATTERN (INTEGRATED ACCESS DEVICE → SWITCH).
1... SIGNALING TO SWITCH, 2... SIGNALING TYPE

| SIGNALING TO SWITCH | | | | SIGNALING TYPE (2/2) | | | | | | | | | | | | | | | | | |
|---|---|---|---|---|---|---|---|---|---|---|---|---|---|---|---|---|---|---|---|---|---|
| | | | | DID-DPO | | | | | FXO-LS, FXO-GS, FXS-GS, TDM-FXS, TDM-FXO | | | | | FXS-LS | | | | | DX, E&M, PLR, TDM-E&M | | |
| A | B | A' | B' | *1 | A | B | C | D | *2 | *1 | A | B | C | D | *2 | *1 | A | B | C | D | *2 |
| 0 | 0 | 0 | 0 | 1 | 0 | 1 | 0 | 1 | 1 | 1 | 0 | 0 | 0 | 0 | 0 | 0 | 1 | 0 | 0 | 0 | 1 |
| 0 | 1 | 0 | 1 | 0 | * | * | * | * | 1 | 0 | 0 | 0 | 0 | 1 | 1 | 1 | 0 | 0 | 0 | 1 | 1 |
| 1 | 0 | 1 | 0 | 1 | 1 | 1 | 1 | 1 | 1 | 1 | 1 | 1 | 1 | 1 | 1 | 0 | 1 | 1 | 1 | 0 | 1 |
| 1 | 1 | 1 | 1 | 0 | * | * | * | * | 1 | 0 | * | * | * | * | 1 | 0 | * | * | * | * | 1 |
| 0 | 0 | 0/1 | 0/1 | 0 | * | * | * | * | 1 | 0 | 0 | 0 | 0 | 0 | 1 | 0 | * | * | * | * | 1 |
| 0 | 1/0 | 0/1 | 0 | 0 | * | * | * | * | 1 | 0 | 0 | 0 | 0 | 1 | 1 | 0 | * | * | * | * | 1 |
| 1 | 0 | 0/1 | 1 | 0 | * | * | * | * | 1 | 0 | * | * | * | * | 1 | 0 | * | * | * | * | 1 |
| 1 | 1/0 | 0/1 | 0/1 | 0 | * | * | * | * | 1 | 0 | * | * | * | * | 1 | 0 | * | * | * | * | 1 |

(*1) 1: AB → ABCD CONVERSION IS EFFECTIVE, 0: CONVERSION IS INEFFECTIVE, AND SIGNALING ONE CYCLE BEFORE IS TRANSMITTED.
(*2) 1: AFTER AB→ABCD CONVERSION, RECOGNITION IS THAT IT IS ON-HOOK STATE, 0: RECOGNITION OF IT IS OFF-HOOK (CALLING) STATE.
* UNDEFINED IN TR-303 OR RESERVED, AND ABCD SIGNALING ONE CYCLE BEFORE IS TRANSMITTED. 1/0 AND 0/1 EACH INDICATES THE "1" AND "0" ARE INTERCHANGEABLE AND IMPLIES THAT IF, E.G., A BIT IS 0, A' BIT BECOMES 1.

FIG. 5

| Service(ISDN FPT) | ISDN PROTOCOL CONVERTING PROCESS (OUTLINE) |
|---|---|
| M-CREATE | 1. PAD DOWNSTREAM-DIRECTIONAL Indicator Bits' 1111111111'b TO MAKE U-POINT ACTIVE THAT IS CONNECTED TO INTEGRATED ACCESS DEVICE.<br>2. PAD Return To Normal OF ADDRESS 7 IN DOWNSTREAN DIRECTION eoc TO CANCEL CONTROL STATE OF U-POINT CONNECTED TO INTEGRATED ACCESS DEVICE.<br>3. SET Attribute IN INITIAL VALUE.<br>4. CLEAR PM REGISTER AND STARTS PM CALCULATION. |
| M-DELETE | 1. PAD DOWNSTREAM-DIRECTIONAL Indicator Bits' 1111111111'b TO DEACTIVATE U-POINT CONNECTED TO INTEGRATED ACCESS DEVICE.<br>2. PAD Return To Normal OF ADDRESS 7 IN DOWNSTREAN DIRECTION eoc TO CANCEL CONTROL STATE OF U-POINT CONNECTED TO INTEGRATED ACCESS DEVICE. |
| SET | <CASE OF CHANGE IN SETTING OF itOHStates value>, PAD DESIGNATED itOHStates VALUE TO DOWNSTREAM-DIRECTIONAL Indicator Bits, <CASE OF CHANGE IN SETTING OF PM Threshold VALUE>, REWRITE DEVICE INTERNAL MANAGEMENT DATA INTO PM Threshold VALUE, <CASE OF INITIALIZING PM REGISTER VALUE TO 0>, 1. INITIALIZE DESIGNATED PM REGISTER TO 0. 2. SPECIFY ADDRESS 1 BY DATA WRITE PROTOCOL (WRITE DATA) WITH RESPECT TO CORRESPONDING PM DATA AND PADD IT IN DOWNSTREAM DIRECTION eoc. |
| M-GET | REPLY Attribute VALUE INTACT THAT IS MANAGED INSIDE DEVICE. |
| M-ACTION: operateIDSNLoopback | INSERT ONE OF Operate 2B+D Loopback, Operate B1 Loopback, Operate B2 Loopback MESSAGES IN DOWNSTREAM DIRECTION eoc THROUGH SPECIFIED CHANNEL BY SPECIFYING ADDRESS 1 (INTEGRATED ACCESS DEVICE), ADDRESS 0 (NT1) DEPENDIG ON SPECIFIED LOCATION. |
| M-ACTION: releaseIDSNLoopback | INSERT Return To Normal MESSAGE IN DOWNSTREAM DIRECITON eoc BY SPECIFYING ADDRESS 1 (LULT), ADDRESS 0 (NT1) DEPENDING ON SPECIFIED LOCATION. |

FIG. 6A

| Service (ISDN FPT) | ISDN PROTOCOL CONVERTING PROCESS (OUTLINE) |
|---|---|
| M-ACTION: generateCorruptedcrc | <SPECIFIED LOCATION IS INTEGRATED ACCESS DEVICE><br>1. INSERT Notify of Corrupted crc MESSAGE WITH ADDRESS 0 IN DOWNSTREAM DIRECTION eoc.<br>2. INSERT Request Corrupted crc MESSAGE WITH ADDRESS 1 IN DOWNSTREAM DIRECTION eoc.<br>3. START UP TIMER FOR SPECIFIED TIME.<br>4. INSERT Return To Normal MESSAGE WITH ADDRESS 1 IN DOWNSTREAM DIRECTION eoc JUST WHEN TIMER COMES TO TIME-OUT.<br><SPECIFIED LOCATION IS NT1><br>1. INSERT Notify of Corrupted crc MESSAGE WITH ADDRESS 1 IN DOWNSTREAM DIRECTION eoc.<br>2. INSERT Request Corrupted crc MESSAGE WITH ADDRESS 0 IN DOWNSTREAM DIRECTION eoc. 3 AND 4 ARE THE SAME AS ABOVE. |
| M-ACTION: initializePMAttributes | <CASE OF SPECIFYING ALL PM Attributes>,<br>1. INITIALIZE ALL PM REGISTERS TO 0.<br>2. INSERT Reset PM Registers to Zero MESSAGE WITH ADDRESS IN DOWNSTREAM DIRECTION eoc. <CASE OF SPECIFYING Current AM Attribute><br>1. INIJTIALIZE PM REGISTER(Current) TO 0.<br>2. EXECUTE Data Write Protocol (Write Data) WITH ADDRESS 1 IN DOWNSTREAM DIRECTION eoc PER PM DATA (Current). |

\* M-ACTION AND M-SET ARE EFFECITIVE IN ONLY Confirmed MODE.

FIG. 6B

| Service(ISDN FPT) | ISDN PROTOCOL CONVERTING PROCESS (OUTLINE) |
|---|---|
| M-ACTION:remove | SET PrimaryServiceState = oos, secondaryServiceState = mt, swtch |
| M-ACTION:restore | SET PrimaryServiceState = is, secondaryServiceState = empty |
| M-ACTION: TransmiteocOpcodeToNT1 | INSERT SPECIFIED Opcode WITH ADDRESS 0 IN DOWNSTREAM DIRECTIN eoc |
| M-EVENT-REPORT: eventReporting | TRANSMIT WHEN DETECTING CHANGE OF PrimaryServiceState. |
| M-EVENT-REPORT: changeOfOverheadBit | TRANSMIT WHEN DETECTING CHANGE OF ntOHStates. |
| M-EVENT-REPORT: lossOfSignal | PERIODICALLY MONITOR UPSTREAM DIRECTION eoc, AND TRANSMIT WHEN DETECTING Loss or Synchronization Word MESSAGE. |
| M-EVENT-REPORT: eventReporting(TCA) | COMPARE PM REGISTER (Current) VALUE WITH Threshold VALUE, AND TRANSMIT WHEN REGISTER VALUE BECOMES OVER Threshold VALUE. |

* M-ACTION AND M-SET ARE EFFECITIVE IN ONLY Confirmed MODE.

FIG. 7

| Attribute(ISDN FPT) | ISDN PROTOCOL CONVERTING PROCESS (OUTLINE) |
|---|---|
| primaryServiceState | 1. is/empty IS SET AT M-CREATE.<br>2. oos/mt, fef IS SET JUST WHEN DETECTING Loss of Superframe Marker, AND is/empty IS SET WHEN RECOVERED. |
| secondaryServiceState | 3. oos/mt, mon IS SET JUST WHEN RECEIVING Loss of Synchronization Word MESSAGE IN TRANSMISSION eoc.<br>4. oos/mt, lpbk ARE SET AT Loopback BOOTING, AND is/empty IS SET AT CANCELATION.<br>5. Oos/mt, swtch ARE SET AT Remove, AND is/empty IS SET AT Restore. |
| ltOHStates | SET '111111111111'b (INITIAL VALUE) AT M-CREATE. 2. PAD THIS VALUE TO DOWNSTREAM-DIRECTIONAL Indicator Bits JUST WHEN VALUE CHANGES.<br>3 SET '111111111111'b AT M-DELETE. |
| ntOHStates | SET UPSTREAM-DIRECTIONAL Indicator Bits VALUE JUST WHEN THIS VALUE CHANGES. |
| channnelSelection | SET '111'b (INITIAL VALUE) AT M-CREATE.<br>2. SET BIT CORRESPONDING TO SPECIFIED CHANNEL TO 0 JUST WHEN SUCEEDING IN M-ACTION:operateISDNLoopback EXECUTION.<br>3. SET BIT CORRESPONDING TO SPECIFIED CHANNEL TO 1 JUST WHEN SUCEEDING IN M-ACTION:releaseISDNLoopback EXECUTION.<br>4. SET '111'b IF THERE OCCURS EVENT THAT PrimaryServiceState CHANGES TO oos DURING M-ACTION:operateISDNLoopback EXECUTION. |
| esHrThreshold<br>sesHrThreshold<br>esDayThreshold<br>sesDayThreshold | 1. MANAGE SPECIFIED VALUE IN M-CREATE WITHIN DEVICE.<br>2. MANAGE SPECIFIED VALUE IN M-SET WITHIN DEVICE. * Threshold Crossing CAN BE DETECTED BY COMPARISON WITH UPSTEAM-DIRECTIONAL PM REGISTER (Current), AND HENCE NO SETTING IS DONE FOR INTEGRATED ACCESS DEVICE BY USING Data Write Protocol (Set PM Threshold) |

*FIG. 8*

| Attribute (ISDN FPT) | ISDN PROTOCOL CONVERTING PROCESS (OUTLINE) |
|---|---|
| cvHrCurrent | AFTER M-CREATE, SPECIFY ADDRESS 1 BY Data Read Protocol (Retrieve data) PER Attribute AT CYLCLE SHORTER THAN ONE HOUR, INSERT IT IN DOWNSTREAM DIRECTON eoc, AND SET RESULT IN CORRESPONDING PM REGISTER (Current). MAPPINGS ARE AS FOLLOWS |
| esHrCurrent | |
| sesHrCurrent | |
| esDayCurrent | |
| sesDayCurrent | |
| cvFeHrCurrent | |
| esFeHrCurrent | |
| sesFeHrCurrent | |
| esFeDayCurrent | |
| sesFeDayCurrent | |
| cvHrPrevious | SHIFT PM REGISTER (Current) to PM REGISTER (Previous) AT INTERVAL OF 1 HOUR OR 24 HOURS. |
| esHrPrevious | |
| sesHrPrevious | |
| esDayPrevious | |
| sesDayPrevious | |
| cvFeHrPrevious | |
| esFeHrPrevious | |
| sesFeHrPrevious | |
| esFeDayPrevious | |
| sesFeDayPrevious | |
| esHrHistory | PM REGISTER (History) IS 7-TIERED, FASTEST IS History#2, AND OLDEST IS History#8. SHIFT PM REGISTER (Previous) to (History#2) AND PM REGISTER (History#n-1) to (History#n) AT INTERVAL OF ONE HOUR. |
| esFeHrHistory | |

*[RECEIPT] INDICATES (DOWNSTREAM) DIRECTION OF RECEIVING FROM SWITCH, AND [TRANSMISSION] INDICATES (UPSTEAM) DIRECTION OF TRANSMITTING TO SWITCH

*Dial-Up SERVICE IS TO LOCAL SWITCH, AND LEASED LINE SERVICE IS TO DCS

*Dial-Up SERVICE IS TO LOCAL SWITCH, AND LEASED LINE SERVICE IS TO DCS

GATEWAY DIGITAL LOOP CARRIER DEVICE

BACKGROUND OF THE INVENTION

The present invention relates to a gateway digital loop carrier device provided between an integrated access device and a switch that have interfaces different from each other.

FIGS. 11A and 11B are diagrams showing a conventional subscriber oriented network. Referring to FIGS. 11A and 11B, a remote digital terminal (RDT) is connected to a local switch (Central Office (CO)) via a digital transmission facility such as optical fibers and so on.

The remote digital terminal is located farther than the central office and accommodates subscriber terminals such as telephones etc. that cannot be accommodated directly in the central office in terms of a problem of distance. The remote digital terminal is based on Telcordia (previously called Bellcore) TR-008 defined as one of the switch interface (interconnection interface) standards (the remote digital terminal based on TR-008 will hereinafter be referred to as "TR-008RDT" as the case may be). On the other hand, the switch is also based on TR-008.

The TR-008RDT converts signals on 96 telephone subscriber lines at the maximum into digital signals DS0s (Digital Signal level 0). Then, the TR-008RDT clusters the converted signals DS0 for every 24 subscribers, multiplexes these signals into four lines (five lines including a protection line) of DSX-1 or T1 signals (DS1) at the maximum, and carries the DSX-1 or T1 signals via the digital transmission facility to the central office. TR-008 basically adopts a fixed time slot allocation scheme between the switch and the RDT.

Over the recent years, the switch and the RDT based on TR-303 or GR-303 as a standard substitute for TR-008 has been spreading (the RDT based on TR/GR-303 will hereinafter be referred to as a "TR/GR-303RDT" as the case may be) for the purposes of efficiently utilizing transmission path bandwidth, doing a standardized operation and management and expanding the subscribers.

The TR/GR-303RDT allocates (time slot allocation) 2048 telephone lines at the maximum to 28 lines of DSX-1 or T1 signals (DS1) at the maximum by a line concentration function. A main target of the service provided by this TR/GR-303RDT is a voice service. Architecture of the network to which the TR/GR-303RDT is applied is much the same as architecture of the network to which the TR-008RDT is applied.

By the way, there has recently increased a demand for data (packet) communications on the Internet, and a remote digital terminal called an integrated access device (IAD) is developed. The integrated access device is a small capacity (one DSX-1 or T1 at the minimum, i.e., 24 DS0s at the minimum) type remote digital terminal that receives data and conventional telephone services.

The integrated access device is generally installed in a small business office steering clear of installing a large capacity device but requiring a predetermined or wider transmission bandwidth. All the integrated access devices support TR-008 as a switch interface.

TR-303 was developed for the purpose of accommodating a multiplicity of subscribers, and hence, if the device implements TR-303, it is required that large-scale and complicated hardware and firmware be incorporated therein. By contrast, an implementation of TR-008 can be actualized by small-scale and simple hardware for firmware.

The integrated access device has only architecture for accommodating telephone (including modem) and ISDN subscribers that implement TR-008, and for connecting these subscribers to the switch supporting TR-008. Namely, the integrated access device supports only TR-008. Therefore, as shown in FIG. 11B, it was unfeasible to provide the service from the switch to the telephones and others by mutually connecting to the switch supporting only TR/GR-303.

SUMMARY OF THE INVENTION

It is a primary object of the present invention to provide a gateway digital loop carrier device for executing an interface conversion between an integrated access device and a switch based on interface standards different from each other.

To accomplish the above object, according to one aspect of the present invention, a gateway digital loop carrier device is provided between a switch and an integrated access device that has interfaces different from each other, executes an interface conversion for connecting the switch and the integrated access device to each other.

According to the present invention, the switch and the integrated access device can be connected to each other by executing the interface conversion. This architecture enables the subscribers accommodated in the integrated access device to utilize the services from the switch with supports the different interface.

According to the present invention, the gateway digital loop carrier device may accommodate the integrated access device accommodating as a subscriber at least one of a telephone, a modem and ISDN and implementing a TR-008 interface, and may connect the subscriber to the switch implementing a TR-303 or GR-303 interface.

The gateway digital loop carrier device according to the present invention may further comprise a signaling converting unit for converting a subscriber line (signaling) system between TR-008 and TR-303 or GR-303.

The gateway digital loop carrier device according to the present invention may further comprise an ISDN overhead converting unit for converting a protocol of overhead information on an ISDN D+(plus) channel between TR-008 and TR-303 or GR-303.

The gateway digital loop carrier device according to the present invention may further comprise a trouble detecting unit for detecting a trouble on a transmission path between the integrated access device and the gateway digital loop carrier device, and a service state information converting unit for converting the detected trouble into subscriber service state information of which the switch is notified, wherein the switch may be notified of the subscriber service state information to stop billing.

In the gateway digital loop carrier device according to the present invention, the switch and the integrated access device can be connected to each other by executing the interface conversion between the integrated access device and the switch that are based on the interface standards different from each other, whereby the subscribers accommodated in the integrated access device are able to utilize the services from the switch.

BRIEF DESCRIPTION OF THE DRAWINGS

FIG. 1A is a TR-008 signaling table in a POTS service;
FIG. 1B is a TR-303 signaling table in the POTS service;
FIG. 2 is a diagram showing an embodiment of a gateway digital loop carrier device according to the present invention;

FIGS. 3A and 3B are tables showing mappings in a Robbed Bit Signaling conversion;

FIGS. 4A and 4B are tables showing mappings in the Robbed Bit Signaling conversion;

FIG. 5 is a table showing mappings between a CMISE service and an ISDN protocol conversion;

FIGS. 6A and 6B are tables showing mappings (ISDN FPT) between the CMISE service and the ISDN protocol conversion;

FIG. 7 is a table showing mappings (ISDN FPT) between CMISE attributes and the ISDN protocol conversion;

FIG. 8 is a table showing mappings (ISDN FPT) between the CMISE attributes and the ISDN protocol conversion;

DESCRIPTION OF THE PREFERRED EMBODIMENTS

[Details of the Present Invention]

Figure 9:
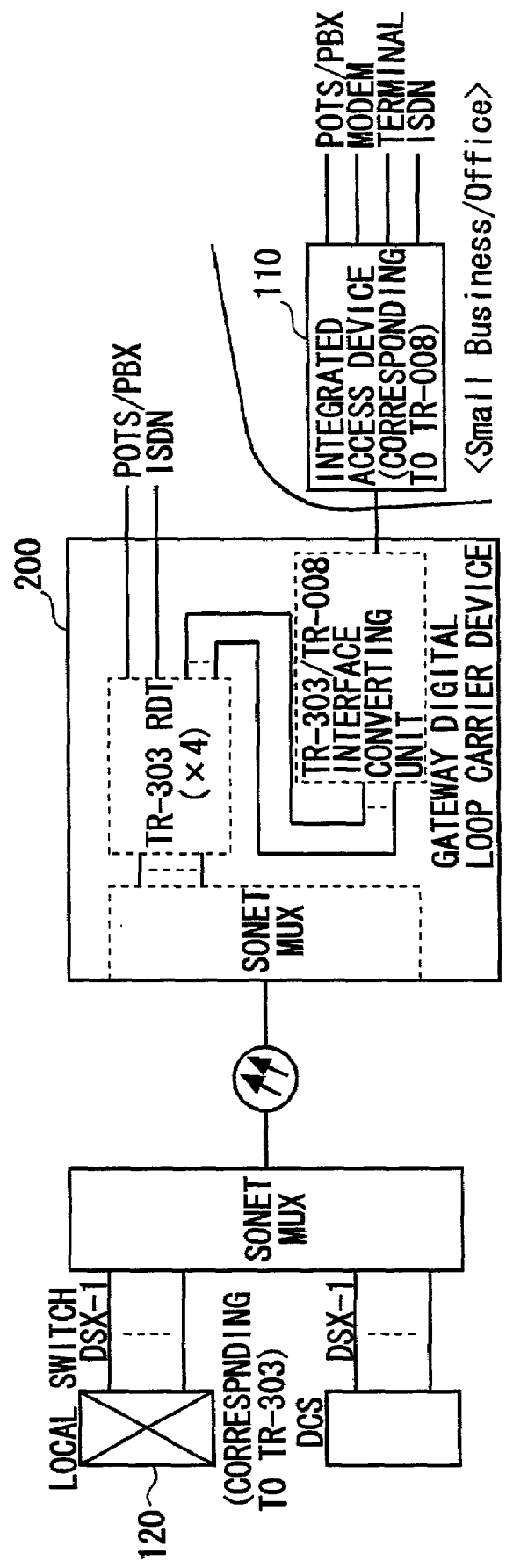
FIG. 9 is a diagram showing a specific example of the embodiment illustrated in FIG. 2.

An integrated access device (IAD) is a device for providing voice services and data services on one single platform by utilizing an xDSL (x Digital Subscriber Line) technology that is recently going to spread. The integrated access device is installed mainly in a small office. The integrated access device generally supports TR-008 with respect to the voice services.

TR-008 is an old type system in the public line network, however, hardware and firmware thereof are small in size and simple. The integrated access device has large requirements such as downsizing of the device and a reduction in cost, and it is therefore optimal to adopt TR-008.

Over the recent years, the public line network has shifted to TR/GR-303 from TR-008. This is conspicuous particularly in newly-risen telephone companies known as CLECs (Competitive Local Exchange Carriers). The integrated access device supports TR-008 but does not support TR/GR-303. This type of integrated access device is incapable of connecting directly to the public line network (switch) adopting TR/GR-303.

The following is a presumption of the reason why the integrated access device does not support TR/GR-303. Originally, the integrated access device deals with the voice service as [something extra], and must avoid a rise in cost and a scale-up of the device due to the voice service. Further, the integrated access device is constructed for the purpose of accommodating several subscribers.

By contrast, TR/GR-303 cancels out the scale-up and complication of the hardware and firmware by accommodating a large quantity of subscribers (over 2000) (a cost per subscriber is reduced).

It is therefore improper that the integrated access device incorporates the hardware and firmware supporting TR/GR-303. This is because, if incorporated, the scale-up and the rise in cost are brought about. The voice service may be conceived as [extra] to the integrated access device but is still as important to an end user as before in the public line network.

On the other hand, if the integrated access device does not support TR/GR-303, it can be considered that the remote digital terminal (TR/GR-303RDT) supporting TR/GR-303 is introduced.

The installer of the integrated access device is, however, the small office. Hence, it cannot be assumed that the small office installs the TR/GR-303RDT becoming optimal in terms of a cost performance by accommodating 2000 or more subscribers. It can be presumed from what has been explained so far that there continues a state where the voice service subscribers embraced by the integrated access device remain unable to connect directly with the TR-303 public line network.

Next, a difference between TR-008 and TR-303 will be explained in depth. The integrated access device (TR-008IAD) supporting TR-008 is physically connectable to a switch (TR-303 switch) that supports TR-303.

Both of the integrated access device (TR-008) and the switch (TR-303), however, must involve the use of DS1 for a transmission signal interface, and DS1 must be divided into DS0s. Even if both of the integrated access device and the switch are physically connectable, however, the normal service cannot be provided. It is because TR-008 and TR-3-3 have the following crucial differences (1)~(3).

(1) Subscriber Line Signaling

Signaling is defined as a system for notifying the switch of a state of a telephone (such as on-hook/off-hook) and dial information. The switch, when directly accommodating the telephone lines, monitors whether the telephone lines (two wires in the case of an ordinary telephone service) form a loop and this loop opens (this shows a signaling system called Loop Start, and the way of how the switch monitors the telephone lines depends on the signaling system). This signaling system enables the switch to know the state of the telephone.

By contrast, if the remote digital terminal or the integrated access device is interposed between the telephone and the switch, the switch is incapable of directly accommodating the telephone lines. It is therefore required that the switch be informed of telephone state by signaling from the remote digital terminal or the integrated access device.

Herein, TR-008 adopts such a system (known as "Robbed Bit Signaling") that a signaling bit is allocated to a predetermined bit of DS0 (the signaling bit overwrites a voice data in the DS0). In this respect, TR-008 and TR-303 are the same.

TR-008, however, defines 2 bits of "A" and "B" at a 1.5 ms [millisecond] cycle by way of Robbed Bit Signaling. On the other hand, TR-303 defines 4 bits of "A", "B", "C" and "D" at a 3 ms [millisecond] cycle by way of Robbed Bit Signaling. Namely, TR-008 can express only four states with 2 bits. In contrast with TR-008, TR-303 expresses 16 states with 4 bits.

TR-303 is a standard created later than TR-008, and a function of TR-303 is extended so that a larger number of states than by TR-008 can be expressed. This implies that if TR-303 is converted into TR-008, there exist unconvertible patterns.

A most typical POTS (Plain Old Telephone Service) will herein be exemplified. POTS is identified by a signaling type called a single party according to TR-008. FIG. 1A shows a table of TR-008 signaling in POTS. FIG. 1B shows a table of TR-303 signaling in POTS.

(1-1) Mutual Conversion between TR-008 and TR-303 for POTS (A) Receiving Direction from Switch A TR-008 channel test is a test initiation indication by a test system connected to the switch for maintenance and is not therefore taken into consideration (not used in TR-303).

As shown in FIGS. 1A and 1B, Forward Disconnect in TR-008 is a state of being possible of converting into LCFO in TR-303. Further, -R Ringing in TR-008 is a state of being possible converting into -R Ringing in TR-303. Moreover, Idle in TR-008 is a state of being possible of converting into LCF in TR-303. By contrast, TR-008 does not have states corresponding to DS0 AIS, DS0 RAI, and RLCF in TR-303.

(B) Transmitting Direction to Switch

As shown in FIGS. 1A and 1B, On-Hook in TR-008 is a state of being possible of converting into LO in TR-303. Further, Off-Hook in TR-008 is a state of being possible of converting into LC in TR-303. Still further, Unequipped in TR-008 is a state of being possible of converting into DS0 AIS in TR-303. By contrast, TR-008 does not have a state corresponding to DS0 RAI in TR-303.

Moreover, the signaling cycle of TR-008 is 1.5 msec, while the signaling cycle of TR-303 is 3 msec. Thus, the cycle for establishing signaling of TR-008 is different from that of TR-303. Therefore, it is not feasible to utilize the service via the switch simply by replacing TR-008 and TR-303 with each other.

(2) Call Control System

Call control is a system for controlling a timeslot connection (start of service) or disconnection (end of service) between the switch and the remote digital terminal or the integrated access device. According to TR-008, basically the timeslot is always connected.

On the other hand, according to TR-303, only when the subscriber originates a call (Off-Hook), the timeslot is assigned by a data link called TMC. This scheme is to effectively utilize the bandwidth. When the subscriber originates the call, a message named SETUP is transmitted to the switch on the data link TMC. Thereafter, the subscriber receives a timeslot connect request (CONNECT message) from the switch, whereby the timeslot is connected. After this connection, a signaling transmission and receipt can be performed at DS0.

Take POTS in TR-303 for example, a problem arising herein is that the subscriber's calling is detected by detecting a loop closure (LC) of the telephone line, and the message SETUP is sent. In this respect, TR-303 does not define a trigger for transmitting SETUP in a case where the subscriber telephone lines are not directly accommodated as in the case of the remote digital terminal. Accordingly, when a TR-008/TR-303 conversion takes place, it is necessary to define what trigger with which SETUP is transmitted.

(3) Monitor/Control System

TR-008 does not particularly define monitoring and controlling except that if a trouble on a transmission path is detected at a receiving end, a notification thereof (called a [remote alarm indication] is sent on a DS1 (SLC96) data link.

On the other hand, TR-303 defines monitoring and controlling which involve the use of a data link called EOC. A TR-303EOC based monitoring/controlling system is defined in CMISE information mode prescribed by TR-303 supplement 3.

According to this definition, the TR-303EOC based monitoring/controlling system is actualized by mapping a physical resource (e.g., a telephone line) of the remote digital terminal to an abstract model known as a managed object, and executing a variety of operations with respect to this abstract model.

On the occasion of executing the TR-008/TR-303 conversion, what is most difficult is a conversion of an ISDN (Integrated Services Digital Network) function. It is required that the ISDN embraced by TR-008 be, precisely, based on a different standard called TR-397.

ISDN monitoring/controlling in TR-397 is performed by a bit-oriented data link called eoc/Indicator Bits contained in overhead information allocated to a U-point (which is a physical interface between ISDN line card and NT1 in a subscriber's house).

TR-303 defines isdnLineTermination and isdnFramedPathTerminaion as ISDN managed objects, and also specifies attributes defined in those managed objects and formulates operations for the managed objects.

TR-303 cannot, however, be converted directly into eoc/Indicator Bits of TR-008 in some cases. For instance, if the ISDN U-point is given a Create request (M-CREATE) or a delete request (M-DELETE) from the TR-303 switch, there is no rule of how to convert in TR-008. This is because TR-008 is based on the premise of being always connected and therefore has no concepts of Create and Delete. Create implies a start of the service, while Delete implies a stop of the service. If deleted, accounting is stopped, and therefore something must be done.

Further, among the attributes specified by TR-303, some attributes are not specified by TR-008. For example, these attributes are primaryServiceState, secondaryServiceState, and channelSelection. There is no rule of how to convert these attributes on TR-008.

Moreover, if U-point performance monitoring data are collected by TR-008 (T-397 eoc), it takes much time. Hence, a performance problem arises if TR-303 is simply converted into TR-008.

On the other hand, if a trouble occurs on the transmission path between the remote digital terminal and the integrated access device in cases other than ISDN, there is a problem of how to make it appear to be the switch. TR-303 is based on the premise of directly accommodating the telephone lines. Therefore, TR-303 has no rule of how to notify (which managed object and with what attribute) if a trouble occurs in DS1 when accommodating the telephone lines not directly but in the form of DS0 on DS1. If the trouble occurs in DS1, an influence is exerted on the call control (i.e., the service), and hence something must be done.

[Embodiments of the Present Invention]

FIG. 2 is a diagram showing an embodiment of a gateway digital loop carrier device 100 of the present invention. The gateway digital loop carrier device 100 is provided between an integrated access device (TR-008IAD) 110 based on TR-008 and a switch (TR/GR-303 switch) 120 based on TR/GR-303, and is connected the device 110 and the switch 120 via communication lines.

The gateway digital loop carrier device 100 includes, an IAD transmission signal terminating unit A, a DS0 demultiplexing/multiplexing unit B connected to the IAD transmission signal terminating unit A, a signaling conversion unit C connected to the DS0 demultiplexing/multiplexing unit B, and a subscriber connection unit D connected to the DS0 demultiplexing/multiplexing unit B and to the signaling conversion unit C. The gateway digital loop carrier device 100 further includes a TR-303RDT unit E connected to the subscriber connection unit D, a switch transmission signal terminating unit F connected to the TR-303RDT unit E, an ISDN OH terminating unit G connected to the DS0 demultiplexing/multiplexing unit B and EOC converting unit H, and an EOC converting unit H connected to the IAD transmission signal terminating unit A and to the ISDN OH terminating unit G. The EOC converting unit H is connected to the IAD transmission signal-terminating unit A. The switch transmission signal terminating unit F is connected to a switch 120 via a communication line.

The IAD transmission signal terminating unit A terminates the transmission signal between the integrated access device 110 and the gateway digital loop carrier device 100. The IAD transmission signal terminating unit A has a transmission signal interface such as SONET, DS3, T1 and so on, and eventually terminates DS1.

The IAD transmission signal terminating unit A detects a trouble on the transmission path between the integrated access device 110 and the gateway digital loop carrier device 100. Further, the IAD transmission signal terminating unit A terminates the DS1 data link. Moreover, the IAD transmission signal terminating unit A extracts Robbed Bit Signaling information of TR-008 per DS0 from the DS1 signals terminated.

The DS0 demultiplexing/multiplexing unit B demultiplexes DS1 terminated by IAD transmission signal terminating unit A into a plurality (24) of DS0s. At this time, if the demultiplexed DS0 is set by user as ISDN and its channel is D+, the DS0 demultiplexing/multiplexing unit B demultiplexes the D+ channel into a D channel and overhead information.

The signaling conversion unit C converts the Robbed Bit Signaling information per DS0 which has been extracted by the IAD transmission signal terminating unit A into Robbed Bit Signaling information of TR-303. This signaling conversion process involves the use of signaling type and a line type per DS0 that are set by the user. Namely, the signaling conversion process is enabled only in a case where the line type is analog, and the way of how the extracted Robbed Bit Signaling information is converted, depends on the signaling type. The signaling conversion process will be described later on. The converted Robbed Bit Signaling information is inserted to DS0 corresponding thereto.

The subscriber connection unit D receives the plurality of demultiplexed DS0s from the DS0 demultiplexing/multiplexing unit B, and determines which port among a plurality of subscriber ports (CRVs: Call reference Values) possessed by the TR-303RDT unit E receives a connection of each DS0. Namely, the subscriber connection unit D specifies a CRV number allocated to each DS0. The user sets which CRV each DS0 is connected to.

The TR-303RDT unit E performs the call control and monitoring/controlling based on TR/GR-303 with respect to DS0 with the CRV number between switch and the RDT. The TR-303RDT unit E executes the call control through a TMC data link and also a process of connecting CRV specified by the switch to DS1/DS0 specified. The monitoring/controlling is carried out through an EOC data link.

The switch transmission signal terminating unit F implements a function of terminating the transmission signal between the gateway digital loop carrier device 100 and the switch 120. The switch transmission signal terminating unit F performs framing of 24 lines of DS0s outputted from the TR-303RDT unit E into DS1, and thereafter multiplexes DS1 into a transmission signal interface (e.g., SONET) required.

The ISDN OH terminating unit (ISDN overhead terminating unit) G terminates ISDN overhead information extracted by the DS0 demultiplexing/multiplexing unit B, and extracts eoc/Indicator Bits contained in the overhead information. Note that the ISDN overhead terminating unit G inserts eoc/Indicator Bits with respect to a downstream direction (a receiving direction from the switch 120).

The EOC converting unit H interprets and generates an EOC message sent from the switch 120, and manages information needed for interpreting and generating the EOC message. The EOC converting unit D manages the transmission path trouble information detected by the IAD transmission signal terminating unit A as service state information of CRV specified by the subscriber connection unit D. The switch 120 is notified of the service state information based on CRV number.

Further, the EOC converting unit H manages Indicator Bits extracted by the ISDN overhead terminating unit G as state-of-overhead (NT1 terminal and subscriber line) information in a network direction (a direction of transmission to the switch 120) with respect to ISDN CRV. The switch 120 is notified of the state-of-overhead information. Eoc is used mainly for maintenance from the switch. The EOC converting unit H interprets the EOC message received from the switch 120 and converts it into eoc.

<Signaling Conversion>

The signaling converting unit C executes a signaling conversion (TR-008/TR-303 conversion) between TR-008 and TR-303 in the following way. To be specific, the signaling converting unit C expresses an AB pattern twice during 2 signaling cycles (3 millisecond (msec)) of TR-008. Namely, the signaling converting unit C expresses an ABA'B' pattern. The AB pattern is a pattern of the cycle of this time, and the A'B' pattern is a pattern of the next cycle.

Three milliseconds is coincident with a period during which an ABCD pattern of TR-303 is established. Non-coincidence of the signaling cycle between TR-008 and TR-303 can be thereby obviated. It is therefore feasible to effect a conversion (a downstream direction) into the AB pattern from the ABCD pattern and a conversion (an upstream direction) into the ABCD pattern from the AB pattern.

According to this, a signaling state (code) after the conversion is not established unless 3 msec have elapsed immediately after the start of the system operation in both of transmitting and receiving to and from the switch 120. TR-303, however, uses the call control in a line concentration system. Namely, in TR-303, the timeslot is in normally in an unconnected state, and signaling does not become transparent between the switch 120 and the gateway digital loop carrier device 100. Hence, no problem arises as for 3 msec delay described above. If the signaling state after the conversion is established, the signaling conversion can be done without any delay from its establishment onwards.

An unconvertible pattern, i.e., a TR-303 based signaling state (code) not defined by TR-008 is converted into a TR-008 code that received at least no influence by this conversion, or alternatively the TR-303 code is substantially ignored.

A case where the signaling type is POTS will be exemplified. If POTS codes received from the switch 120 are DS0 AIS and RLCF, the signaling converting unit C converts these codes into a TR-008 Idle where at least no influence occurs due to this conversion.

By contrast, if the POTS code is DS0 RAI, the signaling converting unit C substantially ignores this code, and sends the code one cycle before without executing the converting process. Therefore, the signaling converting unit C stores the code one cycle before.

On the other hand, when the signaling (code) is transmitted to the switch 120, the signaling converting unit C, if the conversion target signaling (code) is a code undefined by TR-008, does not convert this code and sends the code one cycle before.

Further, when transmitting DS0 RAI to the switch 120, the signaling converting unit C, just when receiving DS0 AIS from the switch 120, overwrites the signaling directed to the switch 120 to the code DS0 RAI.

FIGS. 3A, 3B, 4A and 4B show specific conversion tables each showing the TR-008/TR-303 conversion corresponding to each of a plurality of services including POTS. FIGS. 3A and 3B show the conversion tables (of the ABCD-to-AB pattern conversion) in the case of transmitting the signaling in the downstream direction (the switch 120→ the integrated access device 110). FIGS. 4A and 4B show the conversion tables (of the AB-to-ABCD pattern conversion) in the case of transmitting the signaling in the upstream direction (the integrated access device 110→the switch 120).

The signaling converting unit C converts the signaling state (code) in accordance with the conversion tables shown in FIGS. 3A, 3B, 4A and 4B, and outputs the converted code. The outputted code (bit string) is overwritten to DS0 corresponding thereto.

<Call Control System Conversion>

The TR-303RDT unit E deals with DS0 the same as the telephone line directly accommodated by the gateway digital loop carrier device 100 in order to obviate a difference in call control system between TR-008 and TR-303. That is, TR-303RDT unit E refers to the signaling state (code) corresponding to DS0 in the upstream direction from the subscriber connection unit D, and, if this code is a pattern representing an Off-Hook state, treats this code as calling from the subscriber. Then, the TR-303RDT unit E sends SETUP onto TMC.

Thus, the TR-303RDT unit E sends SETUP to the switch 120, which is triggered by detecting the signaling of the Off-Hook pattern, and connects the time slot between the gateway digital loop carrier device 100 and the switch 120. A signaling pattern to trigger sending SETUP for every signaling type is a signaling pattern corresponding to "0" indicated by *2 in FIGS. 4A and 4B. Take POTS for instance, if the signaling pattern (code) after the conversion is "1111", SETUP is transmitted.

<Monitoring/Controlling System Conversion>

FIGS. 5 and 6 are tables each showing an ISDN protocol converting process for an ISDN service (CMISE Service) that can not be converted directly into eoc/Indicator Bits of TR-008. FIGS. 7 and 8 are tables each showing an ISDN protocol converting process with respect to CMISE Attribute undefined by TR-008. The EOC converting unit H executes the ISDN protocol converting process shown in FIGS. 5, 6A, 6B, 7 and 8.

The EOC converting unit H, in the ISDN protocol converting process, does not collect all categories of performance monitoring data (34 categories) with eoc but collects only Current Count (10 categories), and accumulates Current Count on the side of the gateway digital loop carrier device with respect to Previous and History Count (see FIGS. 7 and 8). A time for collecting the U-point performance monitoring data is thereby reduced.

<Specific Examples>

Figure 10:
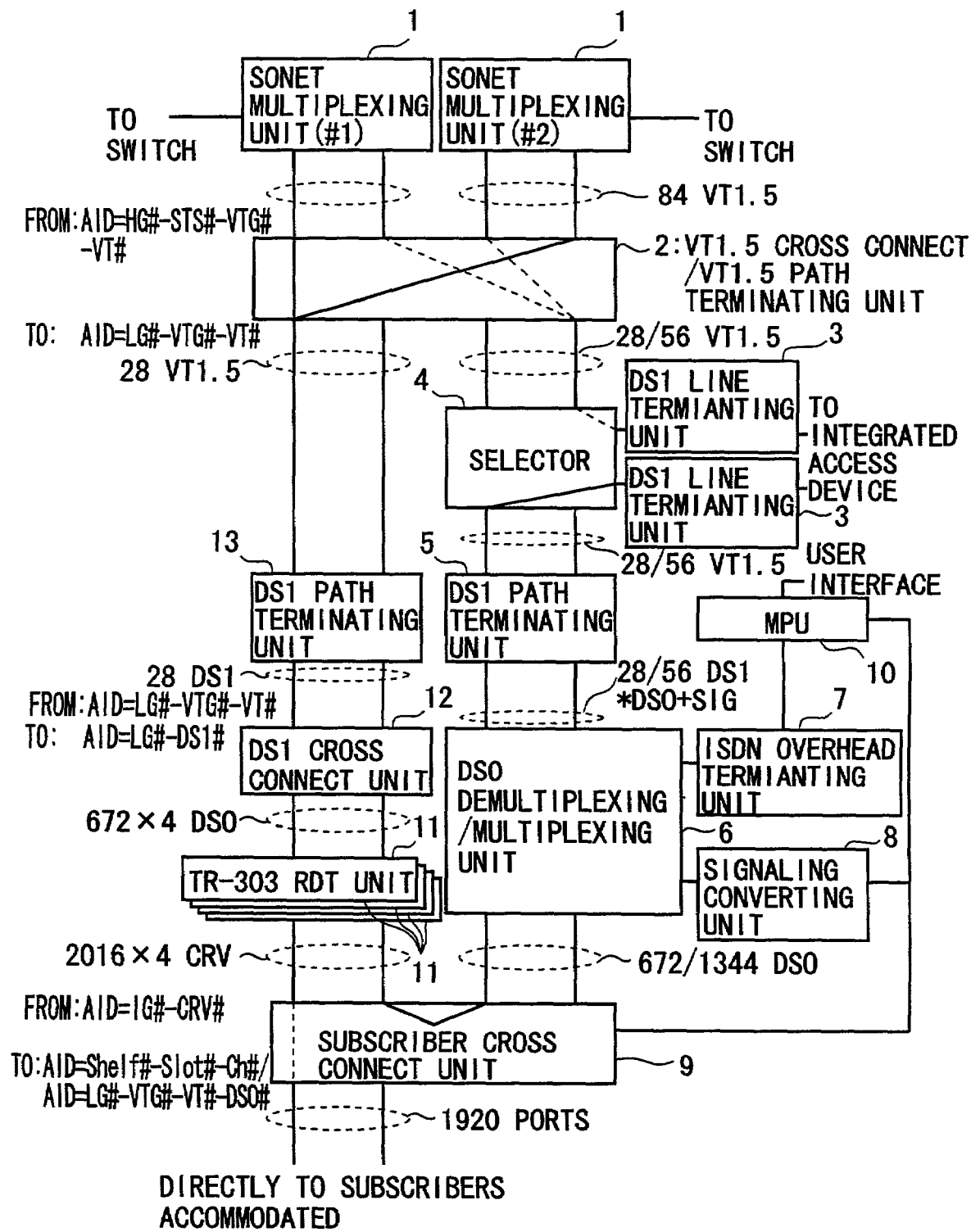
FIG. 10 is a diagram showing a specific example of the embodiment illustrated in FIG. 2.
Figure 11A:
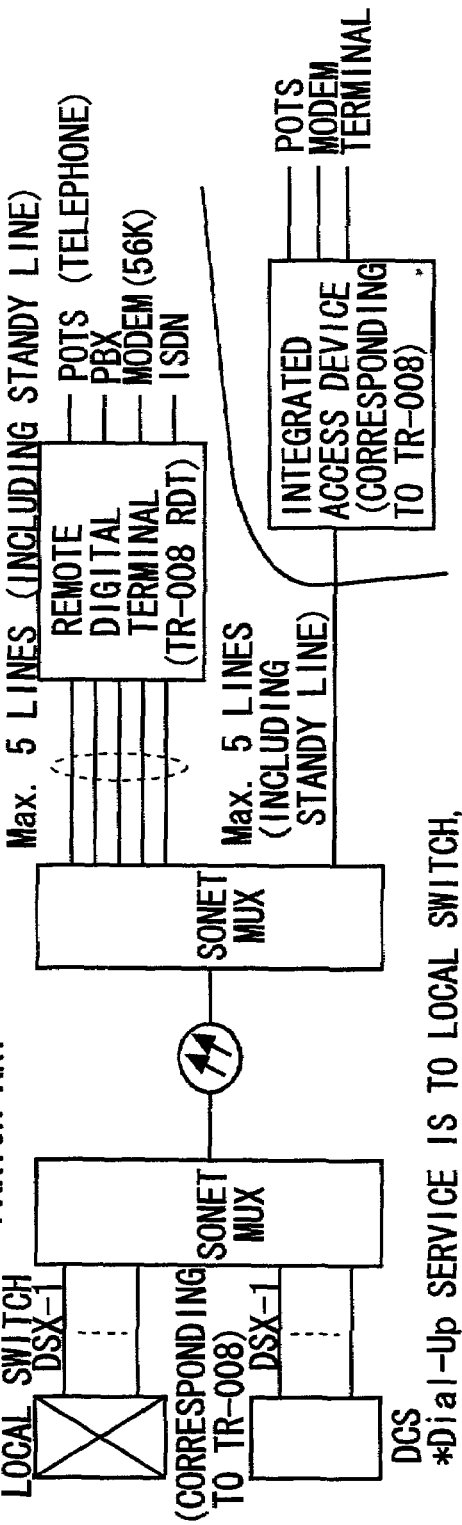
FIG. 11A and 11B are explanatory diagrams showing prior arts.
Figure 11B:
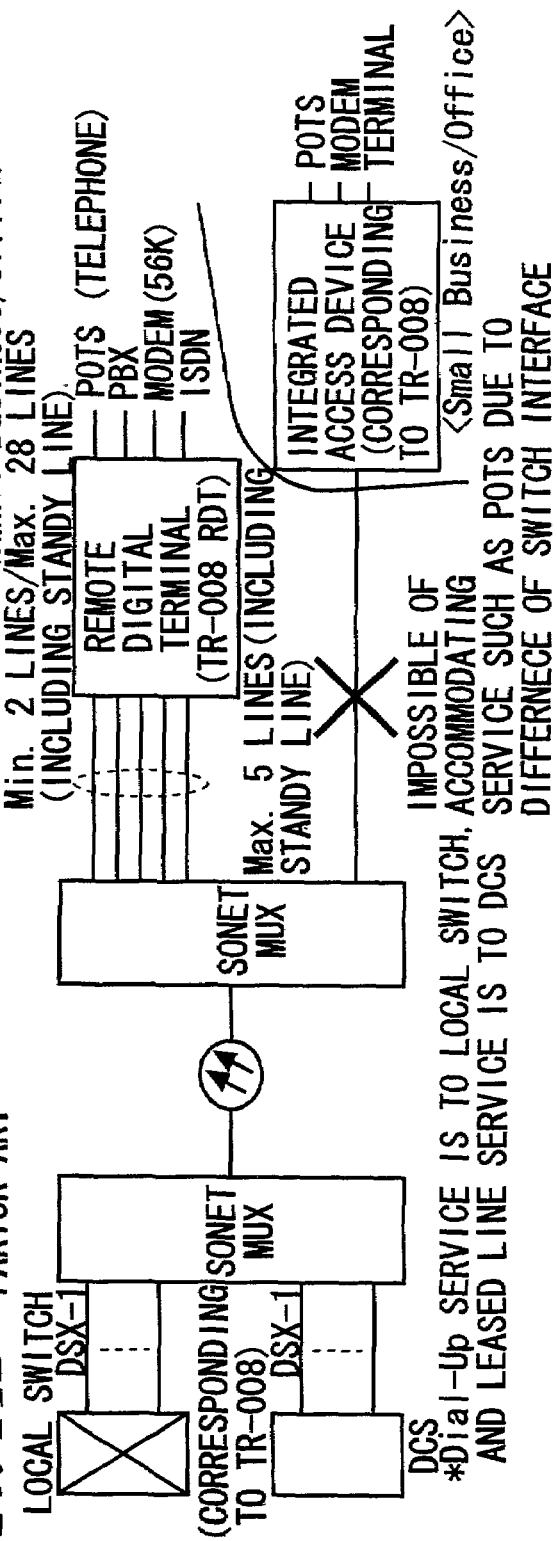

FIG. 9 is a diagram showing an example of the operation of a gateway digital loop carrier device 200 by way of a specific example of the gateway digital loop carrier device 100 shown in FIG. 2. FIG. 10 is a diagram showing an example of architecture of the gateway digital loop carrier device 200 shown in FIG. 9.

The gateway digital loop carrier device 200 accommodates an integrated access device (TR-008IAD) 110 that accommodates a telephone (POTS/PBX), a modem (MODEM), a data terminal and ISDN. The gateway digital loop carrier device 200 is connected to a local switch (TR-303 switch) 120 for providing the voice services via a SONET LINE and to DCS (Digital Cross connect System) 121 for providing data services.

The gateway digital loop carrier device 200 includes a TR-303/TR-008 interface converting unit, a TR-303RDT unit and a SONET multiplexer (SONET multiplexing unit) so that voice subscribers (POTS/PBX, ISDN) accommodated in the integrated access device 110 receive the services from the TR-303 switch 120.

To be specific, the gateway digital loop carrier device 200 includes a plurality of SONET multiplexing units 1, a VT1.5 cross connect unit/VT1.5 path terminating unit 2, a plurality of DS1 line terminating units 3, and a selector 4 connected to the DS1 line terminating unit 3. The gateway digital loop carrier device 200 further includes a DS1 path terminating unit 5 connected to the selector 4, a DS0 demultiplexing/multiplexing unit 6 connected to the DS1 path terminating unit 5, an ISDN overhead terminating unit 7 connected to the DS0 demultiplexing/multiplexing unit 6, a signaling converting unit 8 connected to the DS0 demultiplexing/multiplexing unit 6, a subscriber cross connect unit 9 connected to the DS0 demultiplexing/multiplexing unit 6, and an MPU 10 connected to the DS1 path terminating unit 5, the ISDN overhead terminating unit 7 and the signaling converting unit 8. The gateway digital loop carrier device 200 still further includes a TR-303RDT unit 11 connected to the subscriber cross connect unit 9, a DS1 cross connect unit 12 connected to the TR-303RDT unit 11, and a DS1 path terminating unit 13 connected to the DS1 cross connect unit 12 and also connect to the VT1.5 cross connect unit/VT1.5 path terminating unit 2.

Each of the SONET multiplexing units 1, in the downstream direction, terminates OC-3 or OC-12 signals (of a switch 120 type) on the network side, then demultiplexes the OC-3 or OC-12 signals into a plurality of VT1.5 paths (84 lines o VT1.5 signals) and sends the demultiplexed signals to the VT0.15 cross connect unit/VT1.5 path terminating unit 2.

On the other hand, each of the SONET multiplexing units 1, in the upstream direction, generates the OC-3 or OC-12 signals by multiplexing the plurality of VT1.5 paths, and sends the thus generated signals to the network. Referring to FIG. 9, #1, #2 given to the respective SONET multiplexing unit 1 represent optical interfaces when the SONET lines configure UPSR rings.

The VT1.5 path terminating unit/VT1.5 cross connect unit 2, in the downstream direction, terminates a VT1.5 path extending from the switch 120, then demultiplexes it into a bundle of VT1.5 signals (28/56 lines of VT1.5 signals), and transmits these signals to the selector 4 or the DS1 path terminating unit 13 along these outgoing paths. On the other hand, the VT1.5 path terminating unit/VT1.5 cross connect unit 2, in the upstream direction, generates a VT1.5 path that multiplexes 28/56 lines of VT1.5, and transmits these signals to the SONET multiplexing unit 1 corresponding to the outgoing paths.

The DS1 line terminating unit 3 has a DS-1 or T1 signal interface and, in the upstream direction, terminates the transmission signals between the gateway digital loop carrier device 200 and the integrated access device 110.

The selector 4 executes any one of the following items with respect to the DS1 signals terminated by the DS1 line terminating unit 3 in accordance with the setting by the user.
(a) Connection to the VT1.5 cross connect unit/VT1.5 path terminating unit 2;
(b) Connection to the DS1 path terminating unit 5; and
(c) Non-connection (initial value).

The transmission signals inputted to the gateway digital loop carrier device 200 from the integrated access device 110 are of one type of the data signals (that can be neither divided into DS0s nor accommodated in the switch 120) and the voice signals (that can be divided into DS0s and accommodated in the switch).

The selector 4, if the transmission signals are the data signals, connects the data signals to the VT1.5 cross connect unit/VT1.5 path terminating unit 2, and, if the transmission signals are the voice signals, connects these signals to the DS1 path terminating unit 5 in accordance with the setting by the user.

Further, if the DS1 is not yet used (if not yet connected to the integrated access device 110), the user setting for the selector 4 is done via the MPU 10. The broken line drawn in the selector 4 shown in FIG. 9 indicates an example of connection of the data signals, and the solid line indicates an example of connection of the voice signals.

The DS1 path terminating unit 5 terminates the DS1 path between the gateway digital loop carrier device 200 and the integrated access device 110, and outputs a plurality of DS0s in the DS1 path to the DS0 demultiplexing/multiplexing unit 6. The DS1 path terminating unit 5 detects a trouble on the DS1 Line/Path, terminates the DS1 data link, detects a remote alarm to the DS1 data link, and extracts Robbed Bit Signaling. Extracted Robbed Bit Signaling is outputted together with DS0 to the DS0 demultiplexing/multiplexing unit 6. This DS1 path terminating unit 5 corresponds to the IAD transmission signal terminating unit A shown in FIG. 2, and corresponds to a terminating unit on the side of the integrated access device of the present invention.

The DS0 demultiplexing/multiplexing unit 6 demultiplexes DS1 into a plurality of DS0s. Further, the DS0 demultiplexing/multiplexing unit 6 extracts Robbed Bit Signaling contained in DS0s. Moreover, the DS0 demultiplexing/multiplexing unit 6 terminates the ISDN D+ channel. This DS0 demultiplexing/multiplexing unit 6 corresponds to the DS0 demultiplexing/multiplexing unit B shown in FIG. 2, and corresponds to a demultiplexing unit of the present invention.

The ISDN overhead terminating unit 7 extracts eoc/Indicator Bits from the D+ cannel terminated by the DS0 demultiplexing/multiplexing unit 6, and notifies the MPU 10 of eoc/Indicator Bits. The user sets a line type and a channel type needed for this process in the ISDN overhead terminating unit 7 through the MPU 10. This ISDN overhead terminating unit 7 corresponds to the ISDN overhead terminating unit G shown in FIG. 2.

The signaling converting unit 8 converts TR-008 Robbed Bit Signaling inputted from the DS0 demultiplexing/multiplexing unit 6 into TR-303 Robbed Bit Signaling in accordance with the conversion table shown in FIG. 4, and outputs the converted signaling again to the DS0 demultiplexing/multiplexing unit 6. On the other hand, the signaling converting unit 8 converts the TR-303 Robbed Bit Signaling inputted from the DS0 demultiplexing/multiplexing unit 6 into TR-008 Robbed Bit Signaling in accordance with the conversion table shown in FIGS. 3A and 3B, and outputs the converted signaling again to the DS0 demultiplexing/multiplexing unit 6. The line type and a signaling type required for the signaling conversion are set by the user through the MPU 10. The signaling converting unit 8 corresponds to the signaling converting unit C shown in FIG. 2.

The subscriber cross connect unit 9 has a FROM-side end point and a TO-side end point. The FROM-side end point is a switch-side end point, and the TO-side end point is a subscribed-side end point. In this embodiment, the TO-side end point selects any one of the following items:
(a) Subscriber accommodated directly by the gateway digital loop carrier device 200;
(b) DS0 subscriber accommodated by the integrated access device 110; and
(c) Non-connection (initial value).

A connection of the dotted line drawn in the subscriber cross connect unit 9 in FIG. 9 is an example of connecting the subscriber line (copper line) accommodated directly by the gateway digital loop carrier device 200 to predetermined CRV of the TR-303RDT unit 11. By contrast, a connection of the solid line drawn in the subscriber cross connect unit 9 is an example of connecting the subscriber line (DS0) accommodated by the integrated access device 110 to predetermined CRV. The user sets through the MPU 10 which subscriber line and which CRV are connected to each other. This subscriber cross connect unit 9 corresponds to the subscriber connection unit D shown in FIG. 2.

The MPU 10 is defined as firmware configured by one or more microprocessor(s). The MPU 10 provides at least one of an RS-232 local port (to which the data terminal is connected), an RS-232C modem port (to which the modem is connected), and RS-485 port, a 10BASE-T port (to which LCN (LAN for monitoring device) is connected) and SONET DCC for remote control, as a user interface for the user of the gateway digital loop carrier device 200 to set and inquire about a device state, and accepts the settings from the user therethrough.

The user sets through the user interface on the MPU 10 a line type, a signaling type, an ISDN overhead protocol conversion (setting for a D+ channel) and make a setting with respect to a trouble on the transmission path and settings for the selector 4 and the subscriber cross connect unit 9. The user can make the variety of settings by use of, e.g., TL-1 (Transaction Language 1) provided as a user interface on the MPU 10.

The user settings are terminated within the gateway digital loop carrier device 200 and are distributed to neither the integrated access device 110 nor the switch 120. The user settings necessary for the face-to-face disposed devices (the integrated access device 110 and the switch 120) can be made independently of each other.

Further, the MPU 10 analyzes and generates an EOC/TMC message with respect to the switch 120 in accordance with the user settings. The MPU 10 also executes control and state collection within the gateway digital loop carrier device 200 and the call control of the data link TMC. This MPU 10 corresponds to the EOC converting unit H shown in FIG. 2.

The TR-303RDT unit 11 carries out a timeslot connection and disconnection based on the TMC call control for the connected subscriber. In this embodiment, four pieces of TR-303RDT units 11 are provided and actualized by the dynamic cross connects accommodating 2016 subscribers (having 2016 CRVs) at the maximum on the subscriber (TO) side and 672 DS0s at the maximum on the switch (FROM) side.

Further, the TR-303RDT unit 11 terminates a data link EOC/TMC and executes monitoring and controlling via the data link EOC. This TR-303RDT unit 11 corresponds to the TR-303RDT unit E shown in FIG. 2, and corresponds to a call control unit of the present invention.

The DS1 cross connect unit 12 maps, to any one VT1.5 on SONET, 24 DS0s for every TR-303RDT, which are outputted from the TR-303RDT unit 11. This arrangement schemes to obtain mappings between DS1 logical lines and SONET physical lines.

The DS1 path terminating unit 13 terminates a DS1 path. The DS1 path terminating unit 13 corresponds to the switch transmission signal terminating unit F shown in FIG. 2.

<User Settings>

In this embodiment, the user settings are actualized by the following TL-1 commands via the user interface provided on the MPU 10.

(Setting 1) Setting of Selector 4

Syntax:
ED-VT1:<TID>:<AID>:<CTAG>:::
  <<KEYWORD=DOMAIN>>:;
RTRV-VT1:<TID>:<AID>:<CTAG>:::,

TID:

This is defined as an ASCII character string representing a name of the target gateway digital loop carrier device 200.

AID:

This is defined as a piece of identifying information of the physical transmission path between the target integrated access devices 110, and is expressed in a format such as <LG#>-<VTG#>-<VT#>, where <LG#>={4,5} indicates a slot position, and <VTG#>={1 . . . 7}, <VT#>={1 . . . 4} indicates a DS1 position at the slot concerned.

KEYWORD=DOMAIN:

This command indicates a setting item and a set value with respect to the physical transmission path. The setting item and the set value provided by this command are TYPE and DDL that follow. TYPE={DS0, DS1, NONE} is used for the setting of the selector 4. The user specifies DS0 if the transmission signal carries the voice signal, DS1 if carrying the data signal and NONE (unconnected) if unused. DDL={YES, NO} indicates whether or not the transmission signal carries the data link. The user specifies YES if the transmission signal uses an SLC-96 frame format and on an A-line, and specifies NO if other than this case.

Note that the user is able to refer to the settings with the RTRV-VT1 commands.

(Setting 2) Setting of Line Category

Syntax:
ENT-TO:<TID>:<AID>:<CTAG>:::
  <<KEYWORD=DOMAIN>>:;
ED-TO:<TID>:<AID>:<CTAG>:::
  <<KEYWORD=DOMAIN>>:;
DLT-TO:<TID>:<AID>:<CTAG>::::;
RTRV-TO:<TID>:<AID>:<CTAG>::::;

TID:

This is defined as an ASCII character string representing a name of the target gateway digital loop carrier device.

AID:

This is an identifier of DS0 between the target integrated access devices and is expressed in a format such as <LG#>-<VTG#>-<VT#>-<DS0#>, where <LG#>, <VTG#> and <VT#> are the same as those in (Setting 1) described above and indicate DS0 positions on DS1 concerned with <DS0#>={1 . . . 24}

KEYWORD=DOMAIN:

This command indicates a setting item and a set value with respect to DS0. The setting item and the set value provided by this command are:
GSFN={SINGLE-PARTY, UVG-LS, UVG-GS, COIN-DTF, COIN-CF, ANI2, DID-DPT, DID-DPO, FXO-LS, FXO-GS, FXS-LS, FXS-GS, TDM-FXS, TDM-FXO, TDME&M, DX, E&M, PLR, ISDN, DDS}

In the case of the line type is the analog line, the signaling type is specified. FIGS. 3 and 4 show mappings between the set values, the line types and the signaling types.

When CFA={ONHK, OFFHK, EBSY} and trunk-conditioning, an ENT-TO or ED-TO command is used for setting what state the subscriber line is set in. The ENT-TO command sets concerned DS0 in an in-service state, and the ED-TO command keeps the service state with only a change in setting. A DLT-TO command is used for setting in an out-of-service state. An RTRV-TO command refers to the setting state.

(Setting 3) Subscriber Cross Connect to TR-303RDT Unit 11 and Identification of ISDN D+ Channel Syntax:
ENT-CRS-TO:<TID>:<FROMAID>:<TOAID>:
  <CTAG>::::;
DLT-CRS-TO:<TID>:<FROMAID>:<TOAID>:
  <CTAG>::::;
RTRV-CRS-TO:<TID>:<FROMAID>:<TOAID>:
  <CTAG>::::;

TID:

This is defined as an ACSII character string indicating a name of the target gateway digital loop carrier device.

FROMAID:

This indicates CRV of the TR-303RDT unit 11 and is expressed in a format such as RDT303-<IG#>-<CRV#>-<CH TYPE>, WHERE <IG#>={1 . . . 4} indicates a serial number of the TR-303RDT unit 11, and <CRV#>={1 . . . 2016} indicates CRV (a subscriber identification number corresponding to a telephone number) of an arbitrary TR-303RDT unit 11. A line type of DS0 specified by TOAID is effective in the case of only ISDN/DDS with <CH TYPE>={B1/B2/D/P/S}.

TOAID:

This is a piece of information for specifying DS0 of the integrated access device 110 to be accommodated and is expressed in a format such as <LG#>-<VTG#>-<VT#>-<DS0#>, where <LG#>, <VTG#>, <VT#>, <DS0#> are the same as those in (Setting 2) described above. The connection is established by an ENT-CRS-TO command. A DLT-CRS-TO command disconnects a specified connection. An RTRV-CRS-TO command refers to a connection state.

<EOC Conversion>

The following is a corresponding relation with the information model (Managed Object and Service contaminant therewith) prescribed by TR-303 Supplement 3.

(1) Trouble on Transmission Path between Integrated Access Devices 110

Managed Objects affected when a trouble occurs on the transmission path and when recovered, are analogLineTermination and isdnLineTermination. These Managed Objects have Attributes (corresponding to subscriber service state information) termed primaryServiceState and secondaryServiceState, and are set to primaryServiceState={oos}, secondaryServiceState={mt,fef} when the trouble occurs. By contrast, when recovered from the trouble, the Managed Objects are set to primaryServiceState={is}, secondaryServiceState={ } (empty).

Namely, each DS1 path terminating unit 5 monitors the transmission path between the integrated access device 110 and the gateway digital loop carrier device 200, and detects the trouble on this transmission path. Alternatively, the DS1 path terminating unit 5 receives via the data link the trouble information on the transmission path of which the trouble is detected in the face-to-face disposed device (the integrated access device 110).

When the DS1 path terminating unit 5 detects the transmission path trouble, the MPU 10 voluntarily sets to OUT OF SERVICE (stop of service),a service state (CRV of the TR-303RDT unit 11 corresponding to the transmission path with the trouble occurred) of the subscriber, which is carried on the transmission signal on the transmission path where the trouble occurred. In contrast with this, when the DS1 path terminating unit 5 detects a recovery from the transmission path trouble, the MPU 10 sets to IN SERVICE (during the service) a service state of CRV corresponding to the recovered transmission path.

These Attributes can be referred to with M-GET from the switch 120. On the other hand, the TR-303RDT unit 11 of the gateway digital loop carrier device 200 notifies the switch 120 of a change in the service state of CRV by use of M-EVENT-REPORT.

(2) ISDN Overhead Protocol Conversion

Managed Objects affected are isdnLineTermination and isdnFramePathTermination. FIGS. 5, 6 and 7 show mappings between the protocol conversions and Managed Objects.

Namely, eoc/Indicator Bits extracted by the ISDN overhead terminating unit 7 are transferred to the MPU 10. The MPU 10 converts eoc/Indicator Bits received into an EOC message corresponding thereto. The TR-303RDT unit 11 notifies the switch 120 of the EOC message obtained by this conversion via the data link EOC.

Note that the discussion in this embodiment has been focused on the interface conversion between TR-008 and TR-303, however, the gateway digital loop carrier device 200 in this embodiment can be also configured as a device for executing the interface conversion. The configuration in this case is substantially the same as that in the embodiment described above.

According to the embodiment, the subscribers accommodated in the integrated access device 110 having only the TR-008 interface, are accommodated in the TR/GR-303 switch 120, whereby the service can be provided.

Further, the gateway digital loop carrier device 200 and the integrated access device 110 are capable of independently operating and managing the device and service as in the case of the user settings and so on, and hence there is no time-consuming operation of changing the hardware and the firmware of the gateway digital loop carrier device 200 in a way that depends upon the specifications of the integrated access device 110 to be connected.

In addition, the subscribers accommodated directly in the gateway digital loop carrier device 200 and the subscribers accommodated in the integrated access device 110, are able to coexist in the same TR/GR-303RDT unit 11, whereby the subscribers can be accommodated at a high efficiency.

In accordance with this embodiment, it is feasible to provide the subscribers accommodated by the different device in the TR-008 system with the service exhibiting the same quality as that for the subscribers accommodated directly in the TR-303 based device.

What is claimed is:

1. A gateway digital loop carrier device comprising:
    an integrated access device side terminating unit terminating a transmission signal sent from an integrated access device accommodating as a subscriber at least one of a telephone, a modem and ISDN and implementing a TR-008 interface;
    a demultiplexing unit demultiplexing the terminated transmission signal into DS0 signals;
    a unit performing interface conversion of the demultiplexed DS0 signal from TR-008 to TR-303 or GR-303;
    a TR/GR-303RDT unit based on TR-303 or GR-303 and having a plurality of subscriber ports for sending the interface-converted DS0 signal to a switch implementing a TR-303 or GR-303 interface; and
    a signaling converting unit for converting a subscriber line signaling system between TR-008 and TR-303 or GR-303, wherein
    said signaling converting unit extracts signaling information from the DS0 signals transmitted between said switch and said integrated access device, converts the extracted signaling information between TR-008 and TR-303 or GR-303, and pads the converted signaling information to the DS0 signal,
    the signaling information in the TR-303 or GR-303 format is expressed in a 4-bit pattern outputted at an interval of 3 milliseconds,
    the signaling information in the TR-008 format is expressed in a 2-bit pattern outputted at an interval of 1.5 milliseconds, and
    said signaling converting unit converts the signaling information in the TR-008 format into the signaling information in the TR-303 or GR-303 format by converting the signaling information in the TR-008 format into two pieces of 2-bit patterns outputted in 3 milliseconds.

2. The gateway digital loop carrier device according to claim 1, wherein said interface conversion unit performing interface conversion of DS0 signals from said switch from TR-303 or GR-303 to TR-008, and wherein said gateway digital loop carrier device further comprises a multiplexing unit multiplexing interface-converted DS0 signals and a unit to transmit the multiplexed DS0 signals to said integrated access device.

3. The gateway digital loop carrier device according to claim 1, wherein said signaling converting unit converts the signaling information in accordance with a line type and a signaling type of the DS0 signal.

4. The gateway digital loop carrier device according to claim 1, further comprising a call control unit for executing call control of the DS0 signal with respect to said switch in accordance with TR-303 or GR-303,
    wherein TR-303 or (GR-303 specifies that a time slot is connected to between a source and a destination of a message for connecting the time slot of the DS0 signal in accordance with this message, and
    said call control unit, if the control target DS0 signal contains the signaling information converted in the TR-303 or GR-303 format and if this piece of signaling information indicates an Off-Hook state of said subscriber, sends to said switch a message for connecting said time slot.

5. The gateway digital loop carrier device according to claim 1, further comprising an ISDN overhead converting unit for converting a protocol of overhead information on an ISDN D channel that is contained in the DS0 signal between TR-008 and TR-300 or GR-303.

6. The gateway digital loop carrier device according to claim 5, wherein said ISDN overhead convening unit, if the line type carried on the DS0 signal from said integrated access device is ISDN and if this DS0 signal carries a D channel, extracts monitoring/controlling information out of the ISDN overhead information contained in this DS0 signal, and converts a format of the extracted monitoring/controlling information into the TR-303 or GR-303 format.

7. The gateway digital loop carrier device according to claim 5, wherein said ISDN overhead converting unit, if the line type carried on the DS0 signal from said switch is ISDN and if this DS0 signal carries a D channel, extracts monitoring/controlling information out of the ISDN overhead information contained in this DS0 signal, and converts a format of the extracted monitoring/controlling information into a format based on TR-008.

8. The gateway digital loop carrier device according to claim 1, further comprising a subscriber cross connect unit for connecting, to a predetermined subscriber port, the DS0 signal from said integrated access device and the subscriber line accommodated directly in said gateway digital loop carrier device.

9. A gateway digital loop carrier device comprising:
an integrated access device side terminating unit terminating a transmission signal sent from an integrated access device accommodating as a subscriber at least one of a telephone, a modem and ISDN and implementing a TR-008 interface;
a demultiplexing unit demultiplexing the terminated transmission signal into DS0 signals;
a unit performing interface conversion of the demultiplexed DS0 signal from TR-008 to TR-303 or GR-303;
a TR/GR-303RDT unit based on TR-303 or GR-303 and having a plurality of subscriber ports for sending the interface-converted DS0 signal to a switch implementing a TR-303 or GR-303 interface; and
a signaling converting unit for converting a subscriber line signaling system between TR-008 and TR-303 or GR-303, wherein
said signaling converting unit extracts signaling information from the DS0 signals transmitted between said switch and said integrated access device, converts the extracted signaling information between TR-008 and TR-303 or GR-303, and pads the converted signaling information to the DS0 signal,
said signaling converting unit converts the signaling information in accordance with a line type and a signaling type of the DS0 signal, and
the line type and the signaling type are set on a DS0 basis by a user of said gateway digital loop carrier device.

10. A gateway digital loop carrier device comprising:
an integrated access device side terminating unit terminating a transmission signal sent from an integrated access device accommodating as a subscriber at least one of a telephone, a modem and ISDN and implementing a TR-008 interface;
a demultiplexing unit demultiplexing the terminated transmission signal into DS0 signals;
a unit performing interface conversion of the demultiplexed DS0 signal from TR-008 to TR-303 or GR-303;
a TR/GR-303RDT unit based on TR-303 or GR-303 and having a plurality of subscriber ports for sending the interface-converted DS0 signal to a switch implementing a TR-303 or CR-303 interface; and
an ISDN overhead converting unit for converting a protocol of overhead information on an ISDN D channel that is contained in the DS0 signal between TR-008 and TR-303 or GR-303, wherein
said ISDN overhead converting unit, if the line type carried on the DS0 signal from said integrated access device is ISDN and if this DS0 signal carries a D channel, extracts monitoring/controlling information out of the ISDN overhead information contained in this DS0 signal, and converts a format of the extracted monitoring/controlling information into the TR-303 or GR-303 format, and
if the line type carried on the DS0 signal is ISDN, a user of said gateway digital loop carrier device sets whether or not the DS0 signal carries the D+ channel.

* * * * *

UNITED STATES PATENT AND TRADEMARK OFFICE
CERTIFICATE OF CORRECTION

PATENT NO. : 7,154,897 B2 Page 1 of 1
APPLICATION NO. : 09/960096
DATED : December 26, 2006
INVENTOR(S) : S. Kitayama It is certified that error appears in the above-identified patent and that said Letters Patent is hereby corrected as shown below:

Claim 4 column 16, line 48: " -or ( GR-303- " should be changed to -- ---or GR-303-- --.

Signed and Sealed this

Fourteenth Day of August, 2007

JON W. DUDAS
*Director of the United States Patent and Trademark Office*